(12) United States Patent
Safai et al.

(10) Patent No.: US 10,184,840 B2
(45) Date of Patent: Jan. 22, 2019

(54) PORTABLE DEVICE FOR QUANTIFYING THERMOCHROMATIC COATING SIGNATURES

(71) Applicant: THE BOEING COMPANY, Huntington Beach, CA (US)

(72) Inventors: Morteza Safai, Newcastle, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 766 days.

(21) Appl. No.: 14/591,348

(22) Filed: Jan. 7, 2015

(65) Prior Publication Data

US 2016/0195470 A1 Jul. 7, 2016

(51) Int. Cl.
*G01J 5/28* (2006.01)
*G01K 11/00* (2006.01)
*G01K 11/12* (2006.01)

(52) U.S. Cl.
CPC ............... *G01J 5/28* (2013.01); *G01K 11/00* (2013.01); *G01K 11/12* (2013.01)

(58) Field of Classification Search
CPC .................................. G01J 5/28; G01K 11/00
See application file for complete search history.

(56) References Cited

U.S. PATENT DOCUMENTS

| | | | |
|---|---|---|---|
| 2,666,583 A * | 1/1954 | Whitney | G05D 23/19 236/1 R |
| 3,744,295 A | 7/1973 | Allinikov | |
| 4,072,055 A | 2/1978 | Elliott | |
| 4,092,586 A | 5/1978 | Dinkler et al. | |
| 4,105,583 A | 8/1978 | Glover et al. | |
| 4,137,769 A | 2/1979 | Parker | |
| 4,215,275 A | 7/1980 | Wickersheim | |
| 4,232,552 A | 11/1980 | Hof et al. | |
| 4,339,951 A | 7/1982 | Yee et al. | |

(Continued)

FOREIGN PATENT DOCUMENTS

| DE | 102012203655 A1 | 9/2013 |
|---|---|---|
| WO | 2006127569 A2 | 11/2006 |

OTHER PUBLICATIONS

EPO Examination Report for related application 15193661.4 dated Aug. 10, 2017; 4 pp.

(Continued)

*Primary Examiner* — Georgia Y Epps
*Assistant Examiner* — Don Williams
(74) *Attorney, Agent, or Firm* — Armstrong Teasdale LLP

(57) ABSTRACT

A portable device for quantification of thermochromatic coating signatures is provided. The portable device includes a directing component configured to direct light to a target having a thermochromatic coating. Additionally, the portable device includes a conditioning component configured to condition reflected light from the target, the reflected light including thermochromatic coating signatures. The portable device also includes an image detector configured to generate images from the conditioned reflected light, and a processor configured to receive and analyze images from the image detector and identify at least one portion of the target that has exceeded a predefined temperature or predefined temperature variance based on the analyzed images.

20 Claims, 8 Drawing Sheets

(56) References Cited

U.S. PATENT DOCUMENTS

| | | |
|---|---|---|
| 4,437,772 A | 3/1984 | Samulski |
| 4,448,547 A | 5/1984 | Wickersheim |
| 4,652,143 A | 3/1987 | Wickersheim et al. |
| 4,805,188 A | 2/1989 | Parker |
| 4,863,282 A | 9/1989 | Rickson |
| 4,895,156 A | 1/1990 | Schulze |
| 5,053,339 A | 10/1991 | Patel |
| 6,171,524 B1 | 1/2001 | Kubichan |
| 6,214,623 B1 | 4/2001 | Simons et al. |
| 6,366,403 B1 * | 4/2002 | Kurtz .................. F27D 21/02 250/216 |
| 6,466,299 B1 | 10/2002 | Lehtiniemi et al. |
| 6,483,275 B1 | 11/2002 | Nebrigic et al. |
| 6,682,121 B1 | 1/2004 | Conforti |
| 7,278,369 B2 | 10/2007 | Kelley et al. |
| 8,002,851 B2 | 8/2011 | Fyvie et al. |
| 8,671,871 B2 | 3/2014 | Huffman et al. |
| 9,267,993 B2 | 2/2016 | Farmer et al. |
| 2003/0067465 A1 * | 4/2003 | Jelinek .................. G09B 11/00 345/467 |
| 2006/0008699 A1 | 1/2006 | Um |
| 2007/0158624 A1 | 7/2007 | Weder et al. |
| 2007/0286971 A1 | 12/2007 | Cooper et al. |
| 2010/0247900 A1 | 9/2010 | Parker et al. |
| 2011/0100545 A1 * | 5/2011 | Krattiger .......... A61B 17/00491 156/272.2 |
| 2011/0123712 A1 | 5/2011 | Becker, IV et al. |
| 2012/0079981 A1 | 4/2012 | Huffman et al. |
| 2012/0205386 A1 | 8/2012 | Owen et al. |
| 2013/0273406 A1 | 10/2013 | Ihara et al. |
| 2014/0044609 A1 | 2/2014 | Prusik et al. |
| 2014/0273240 A1 | 9/2014 | Georgeson et al. |
| 2014/0328369 A1 | 11/2014 | Flinn et al. |
| 2015/0367733 A1 | 12/2015 | Peel et al. |
| 2016/0011270 A1 | 1/2016 | Poirier |
| 2016/0195470 A1 | 7/2016 | Safai et al. |
| 2016/0315361 A1 | 10/2016 | Petzinger |
| 2018/0038792 A1 | 2/2018 | Toivola et al. |

OTHER PUBLICATIONS

U.S. Appl. No. 14/337,622, filed Jul. 22, 2014.
Extended European Search Report for Application No. 15193661.4, dated Jan. 29, 2016, 8 pages.
EP Examination Report for related application 15193661.4 dated Apr. 24, 2018, 4 pp.

* cited by examiner

US 10,184,840 B2

PORTABLE DEVICE FOR QUANTIFYING THERMOCHROMATIC COATING SIGNATURES

BACKGROUND

The present disclosure relates generally to detecting temperatures of objects, and more specifically to detecting temperatures of objects using thermochromatic coatings.

In at least some systems, an object is coated with a thermochromatic coating that emits a thermochromatic response when subjected to light within a predefined frequency range. The thermochromatic response is, for example, light having one or more colors and intensities that are associated with corresponding temperatures that the object experienced within a predefined time period. When the thermochromatic response is sampled, for example using a camera or other imaging device, ambient light and/or other sources of electromagnetic radiation may interfere with the sampling and affect the identification of the colors and intensities in the thermochromatic response. Additionally, in some known systems, identification of the colors and intensities is performed by a human, using a subjective analysis, rather than by a computing device that objectively identifies the colors and intensities.

BRIEF DESCRIPTION

In one aspect, a portable device for quantification of thermochromatic coating signatures is provided. The portable device includes a directing component configured to direct light to a target having a thermochromatic coating. Additionally, the portable device includes a conditioning component configured to condition reflected light from the target, the reflected light including thermochromatic coating signatures. The portable device also includes an image detector configured to generate images from the conditioned reflected light, and a processor configured to receive and analyze images from the image detector and identify at least one portion of the target that has exceeded a predefined temperature or predefined temperature variance based on the analyzed images.

In another aspect, a method for use in quantifying thermochromatic coating signatures is provided. The method includes directing, by a directing component included in the portable device, light towards a target having a thermochromatic coating. The method also includes conditioning, by a conditioning component in the portable device, reflected light from the target, the reflected light including thermochromatic coating signatures. Additionally, the method includes generating, by an image detector in the portable device, images from the reflected light. Additionally, the method includes receiving and analyzing, by a processor in the portable device, images from the image detector. The method also includes identifying, by the processor, at least one portion of the target that has exceeded a predefined temperature or predefined temperature variance based on the analyzed images.

DETAILED DESCRIPTION

Figure 1:
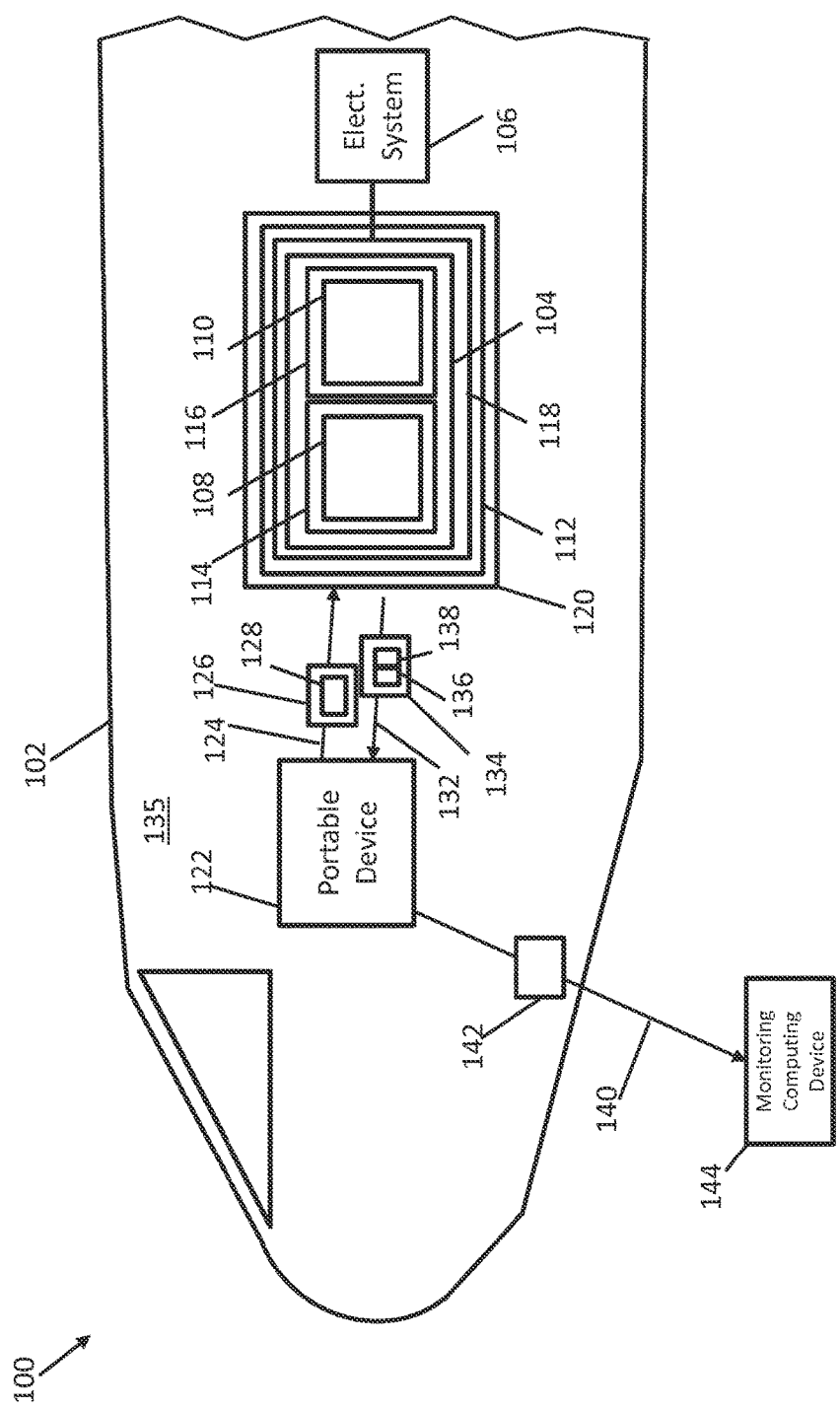
FIG. 1 is a diagram of an example environment in which temperatures of a battery are monitored.

Implementations of the systems described herein provide a portable device, such as a handheld device, configured to be used for field application in quantifying thermochromatic coating signatures (e.g., colors and intensities in thermochromatic responses). The portable device enables quantification of thermochromatic coating signatures for an object without removing the object from its installed location. For example, the portable device enables quantification of thermochromatic coating signatures of a battery installed in an aircraft without requiring that the battery first be relocated to a dark room that is relatively free of ambient light or other sources of light or electromagnetic radiation that could interfere with the identification of colors and intensities in a thermochromatic response emitted by a thermochromatic coating on the battery. At least some implementations of the portable device include a band-pass filter that filters out electromagnetic radiation (e.g., light) that is not within a predefined frequency range. Also, in some implementations, the portable device includes a polarization filter that removes or reduces glare from the object being analyzed (e.g., a battery) and/or solar radiation. The portable device performs a "pump and probe" process by emitting excitation energy at a particular wavelength that is capable of exciting chromatic particles (e.g., probes) that have been affected by temperatures experienced by the object (e.g., battery). Once the chromatic particles have absorbed the excitation energy, the chromatic particles produce a signal back in a de-excitation process that provides characteristics of the temperatures they have experienced. The portable device converts the received signal to a temperature reading (e.g., a number of degrees Celsius or Fahrenheit).

In one implementation, a computer program is provided, and the program is embodied on a computer-readable medium. In an example implementation, the computer program is executed on a single or standalone computing device, without requiring a connection to a server computer. The computer program is flexible and designed to run in various different environments without compromising any major functionality. In other implementations, the system includes multiple components distributed among a plurality of computing devices. One or more components may be in the form of computer-executable instructions embodied in a computer-readable medium. The systems and processes are not limited to the specific implementations described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

FIG. 1 is a diagram of an environment 100 in which temperatures of a battery 104 are monitored. Battery 104 is installed in a vehicle 102, such as an aircraft and is coupled to an electrical system 106. Battery 104, which is, for example, a lithium ion battery, includes a plurality of cells, including a first cell 108 and a second cell 110. In at least some implementations, battery 104 is contained within a container 112. First cell 108 is coated with a first thermochromatic coating 114. Second cell 110 is coated with a second thermochromatic coating 116. Battery 104 is coated with a third thermochromatic coating 118, and container 112 is coated with a fourth thermochromatic coating 120. Each thermochromatic coating 114, 116, 118, and 120 is configured to fluoresce with colors and intensities that represent temperatures experienced along the surfaces of thermochromatic coatings 114, 116, 118, and 120 within a predefined time period (e.g., the last 4 hours). In particular, each thermochromatic coating 114, 116, 118, and 120 fluoresces in response to being exposed to a particular frequency or frequency range of electromagnetic radiation. In some implementations, the electromagnetic radiation is in the ultraviolet light frequency range (e.g., wavelengths of 400 nm to 10 nm). In at least some implementations, the thermochromatic coatings 114, 116, 118, and 120 are the same or substantially the same material.

Each thermochromatic coating 114, 116, 118, and 120 is, for example, a composite that includes a matrix and one or more types of probes. In at least some implementations, one type of probe activates (e.g., fluoresces) after exceeding a baseline temperature of, for example 200 degrees Celsius. Other types of probes have different baseline temperatures that, when exceeded, cause the probes to activate. The matrix is any material capable of supporting the probes without adversely affecting the fluorescing properties of the probes. In some implementations, the matrix is one or more of a thermoset polymer, a thermoplastic polymer, and a sol-gel. In some implementations, the matrix is a polymer of the types used to form carbon-fiber reinforced plastic composite.

Figure 6:
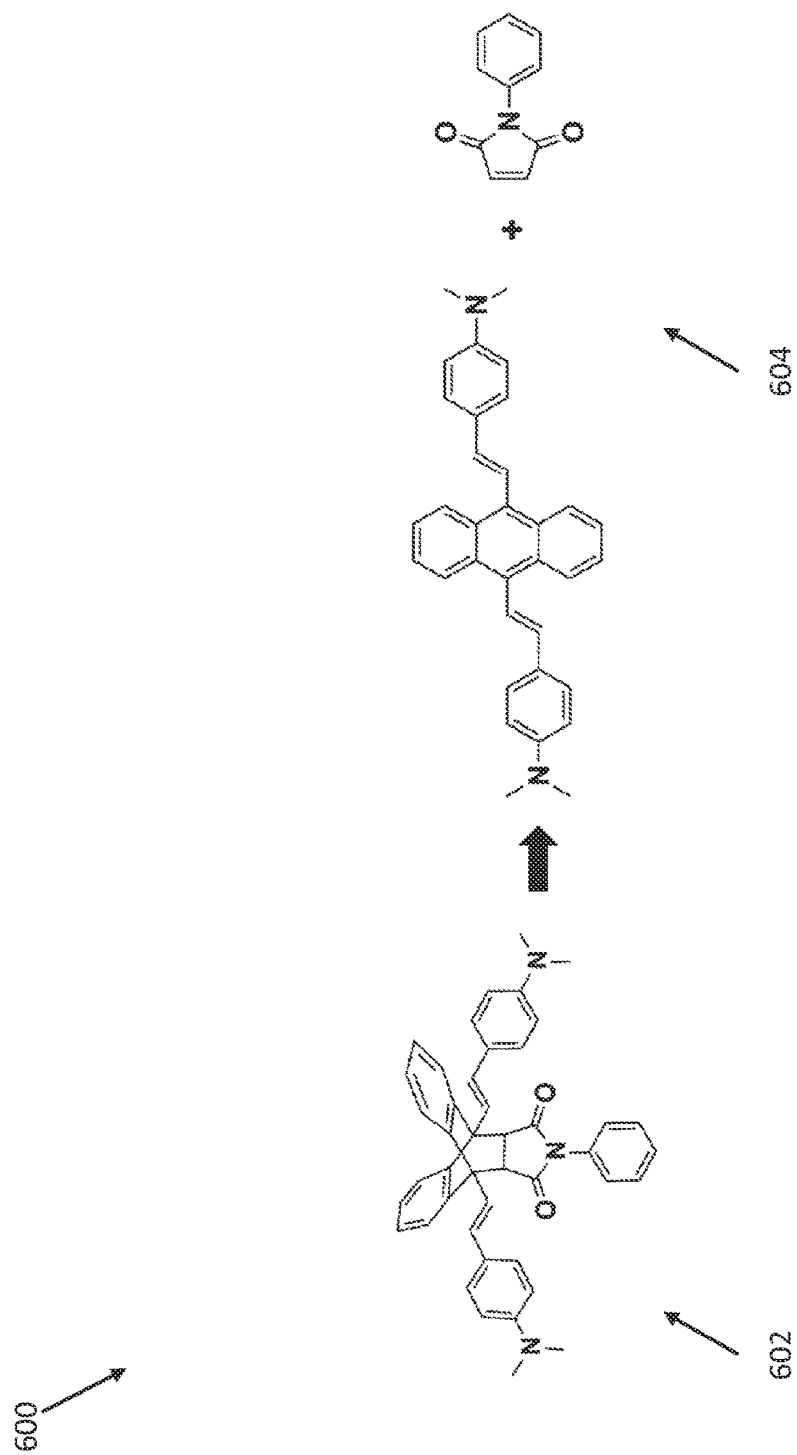
FIG. 6 is a diagram of a relationship between a first state and a second state of a first type of probe.
Figure 7:
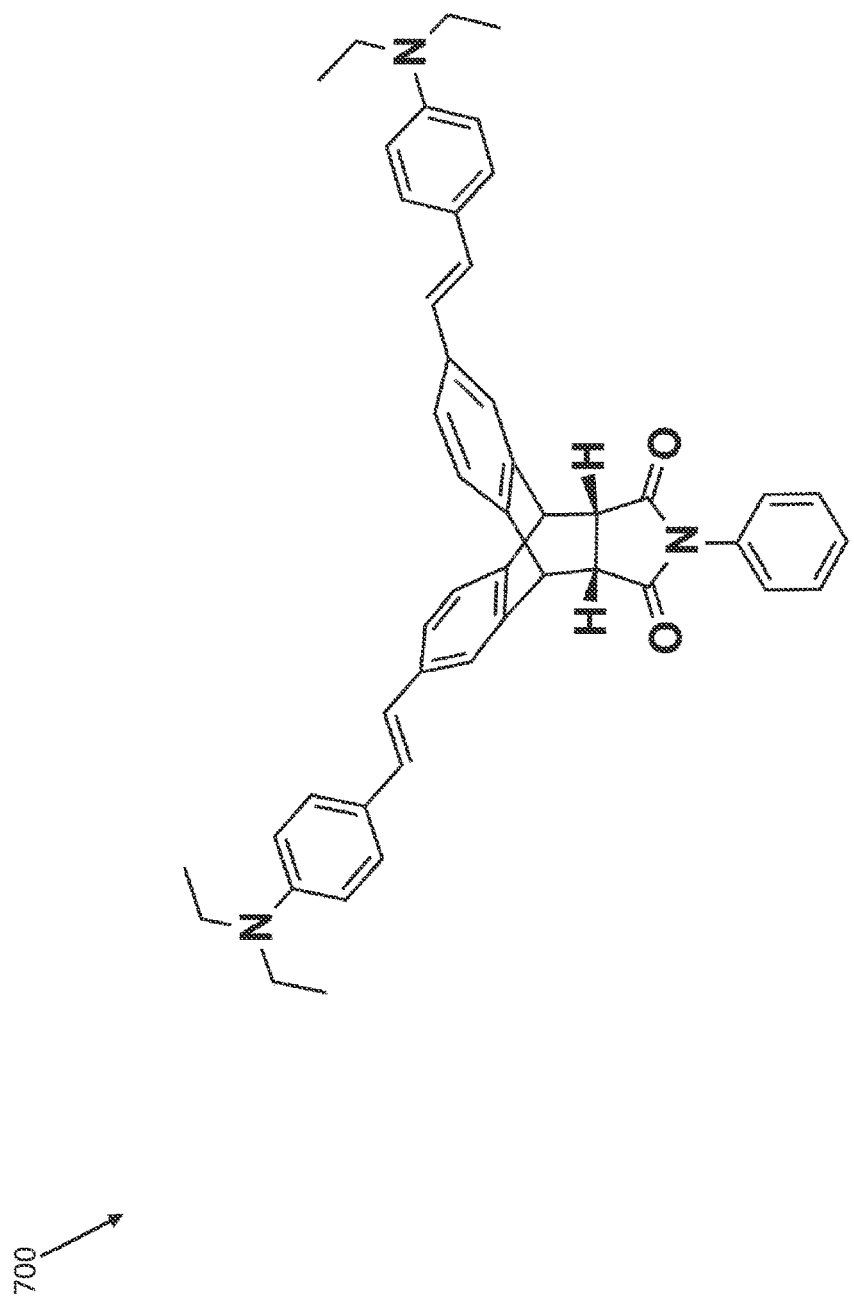
FIG. 7 is a diagram of a molecular structure of a second type of probe.

The polymer matrix materials include, for example, classes of two-part epoxy resins, such as Hysol EA 9390, Araldite MY 720/Aradur 876, or Toray 3900 with various amine based curing agents (e.g. 2,2'-Dimethyl-4,4'methylenebis(cyclohexylamine)). The probes are incorporated within the matrix. For example, the probes are mixed into a liquid form of the thermochromatic coating or applied to a surface of the matrix. Thermal activation of fluorescence in the probes occurs when an adduct moiety is removed, causing the probe to transition from a non-fluorescent state to a fluorescent state. FIG. 6 is a relationship 600 between a first molecular structure 602 of a first type of probe known as AJNDE16 prior to experiencing a temperature beyond a baseline temperature (e.g., greater than 200 degrees Celsius) and a second molecular structure 604 after the probe has experienced temperatures beyond the baseline temperature and, therefore, has been activated. FIG. 7 shows a molecular structure 700 of a second type of probe known as AJNDE35 that has a different baseline temperature and different responses (i.e., colors and intensities at different temperatures) than the first type of probe (i.e., AJNDE16).

Figure 8:
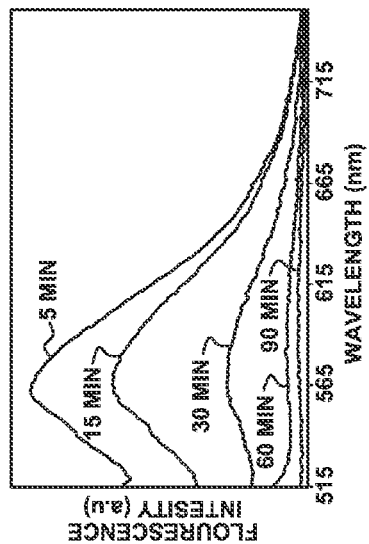
FIG. 8 is a first chart of response curves of a thermochromatic coating including the first type of probe.
Figure 9:
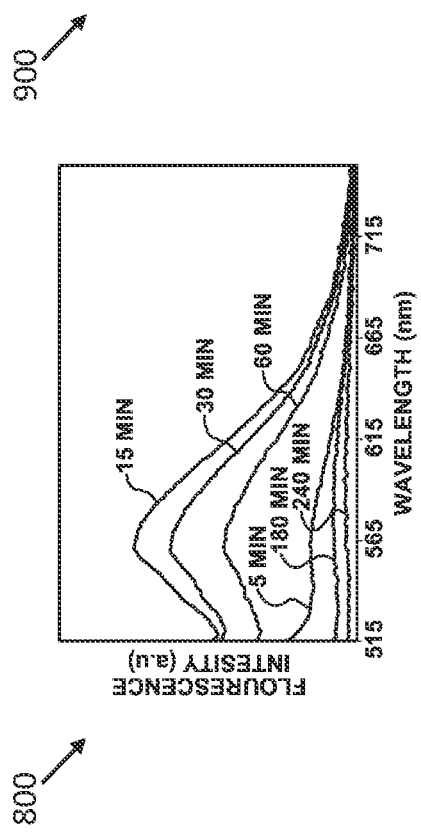
FIG. 9 is a second chart of response curves of the thermochromatic coating including the first type of probe.
Figure 10:
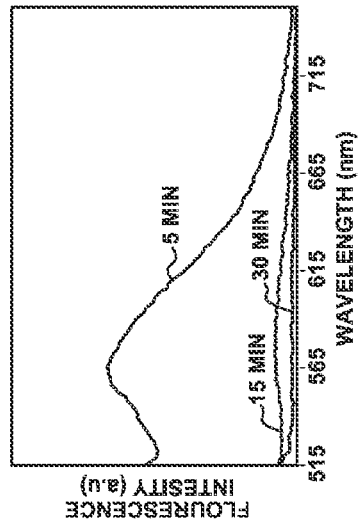
FIG. 10 is a third chart of response curves of the thermochromatic coating including the first type of probe.

FIG. 8 is a chart 800 of response curves (i.e., fluorescence intensity versus wavelength (color)) of a thermochromatic coating (e.g., one or more of first coating 114, second coating 116, third coating 118, and fourth coating 120) including AJNDE16 probes, when subjected to a temperature of 204 degrees Celsius for different amounts of time. FIG. 9 is a chart 900 of response curves of a thermochromatic coating (e.g., one or more of first coating 114, second coating 116, third coating 118, and fourth coating 120) including AJNDE16 probes, when subjected to a temperature of 232 degrees Celsius for different amounts of time. FIG. 10 is a chart 1000 of response curves of a thermochromatic coating (e.g., one or more of first coating 114, second coating 116, third coating 118, and fourth coating 120) including AJNDE16 probes, when subjected to a temperature of 260 degrees Celsius for different amounts of time. More specifically, the response curves in FIGS. 8 through 10 represent colors and intensities emitted (thermochromatic responses) by one or more thermochromatic coatings coating (e.g., one or more of first coating 114, second coating 116, third coating 118, and fourth coating 120) that include AJNDE16 probes when subjected to 470 nm electromagnetic radiation.

In operation, a portable device 122 emits an activation signal 124 that includes electromagnetic radiation 126 (e.g., light) at a predefined frequency 128 (e.g., an ultraviolet light frequency) towards thermochromatic coatings 114, 116, 118, and 120. In response, the thermochromatic coatings 114, 116, 118, and 120 emit a response signal 132 that is received by the portable device 122. Response signal 132 includes a thermochromatic response 134, including colors 136 and intensities 138 (e.g., candela) emitted by thermochromatic coatings 114, 116, 118, and 120 indicative of temperatures experienced by thermochromatic coatings 114, 116, 118, and 120 within a predefined time period (e.g., 4 hours).

In at least some implementations, portable device 122 transmits an output signal 140, for example wirelessly, to a monitoring computing device 144. Output signal 140 includes one or more images 142 of the thermochromatic response 134. In at least some implementations, monitoring computing device 144 stores and performs further analysis on images 142. In at least some implementations, portable device 122 stores images 142 locally, for example in memory 316 (FIG. 3) and/or displays images 142 to a user (e.g., user 401) via a display device (e.g., display device 318).

Figure 2:
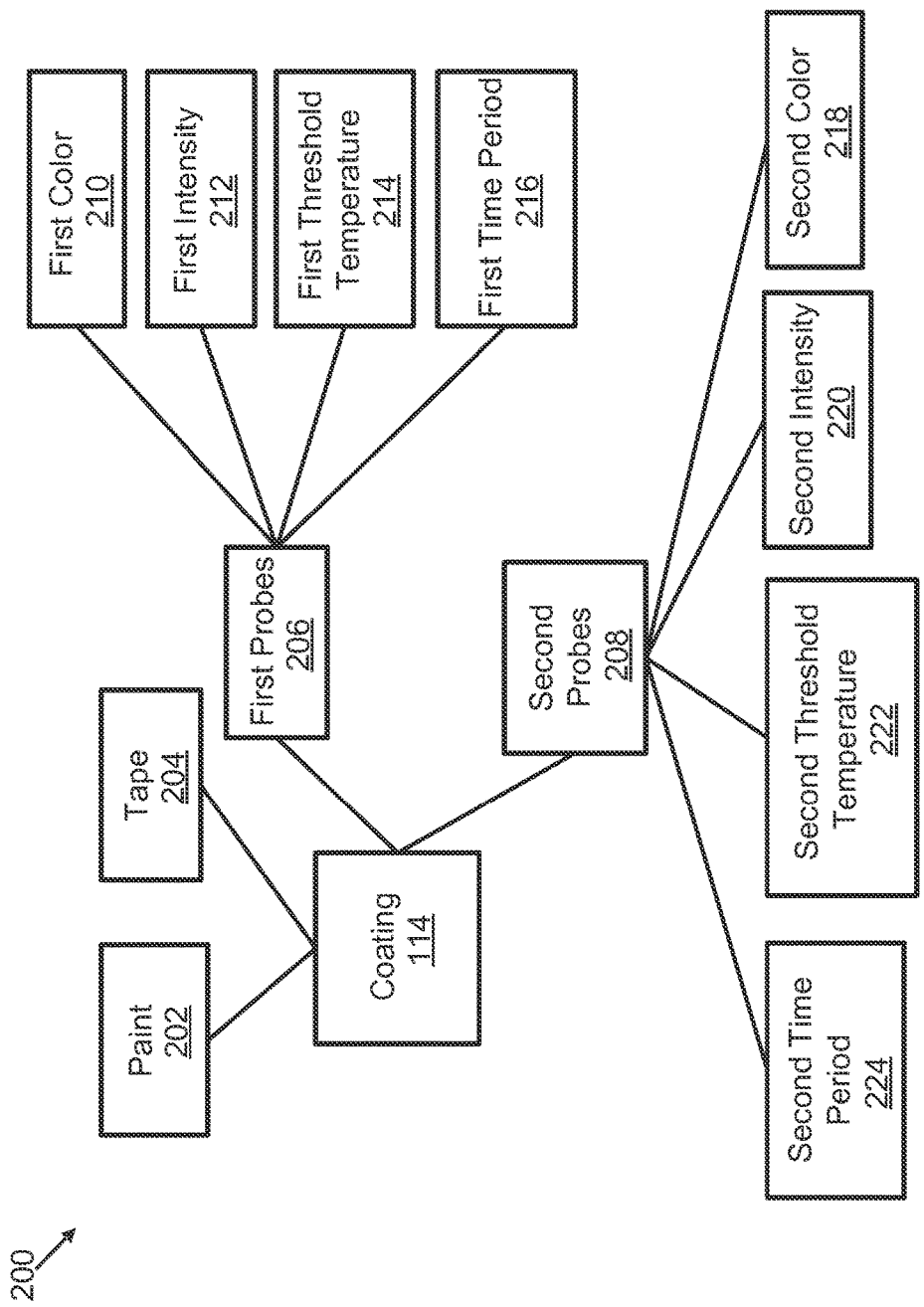
FIG. 2 is a block diagram of components of an example thermochromatic coating used in monitoring temperatures of the battery of FIG. 1.

FIG. 2 is a block diagram of components 200 of first thermochromatic coating 114. In at least some implementations, second thermochromatic coating 116, third thermochromatic coating 118, and fourth thermochromatic coating 120 are the same or substantially the same materials. First thermochromatic coating 114 may be embodied as a thermochromatic paint 202 or a thermochromatic tape 204. The first thermochromatic coating 114 includes first probes 206 that are configured to fluoresce with a first color 210 and first intensity 212 when first probes 206 exceed a first threshold temperature 214 and are exposed to a predefined frequency of electromagnetic radiation (e.g., ultraviolet light). First probes 206 remain configured to fluoresce at the first color 210 and first intensity 212, when exposed to the predefined frequency of electromagnetic radiation, within a first time period 216 (e.g., four hours) after exceeding the first threshold temperature 214. In other words, first probes 206 have a memory of temperatures experienced by first probes 206. In some implementations, first color 210 is a range of colors, first intensity 212 is a range of intensities and first threshold temperature 214 is a range of temperatures corresponding to the ranges of colors and intensities.

In some implementations, first thermochromatic coating 114 includes second probes 208 that are configured to fluoresce with a second color 218 and second intensity 220 when second probes 208 exceed a second threshold temperature 222 and are exposed to a predefined frequency of electromagnetic radiation (e.g., ultraviolet light) within a second time period 224. Second probes 208 remain configured to fluoresce at the second color 218 and second intensity 220, when exposed to the predefined frequency of electromagnetic radiation, during a second time period 224 (e.g., four hours) after exceeding the second threshold temperature 222. In some implementations, second color 218 is a range of colors, second intensity 220 is a range of intensities and second threshold temperature 222 is a range of temperatures corresponding to the ranges of colors and intensities. In at least some implementations, one or more of second color 218, second intensity 220, second threshold temperature 222, and/or second time period 224 are different than first color 210, first intensity 212, first threshold temperature 214, and/or first time period 216.

Figure 3:
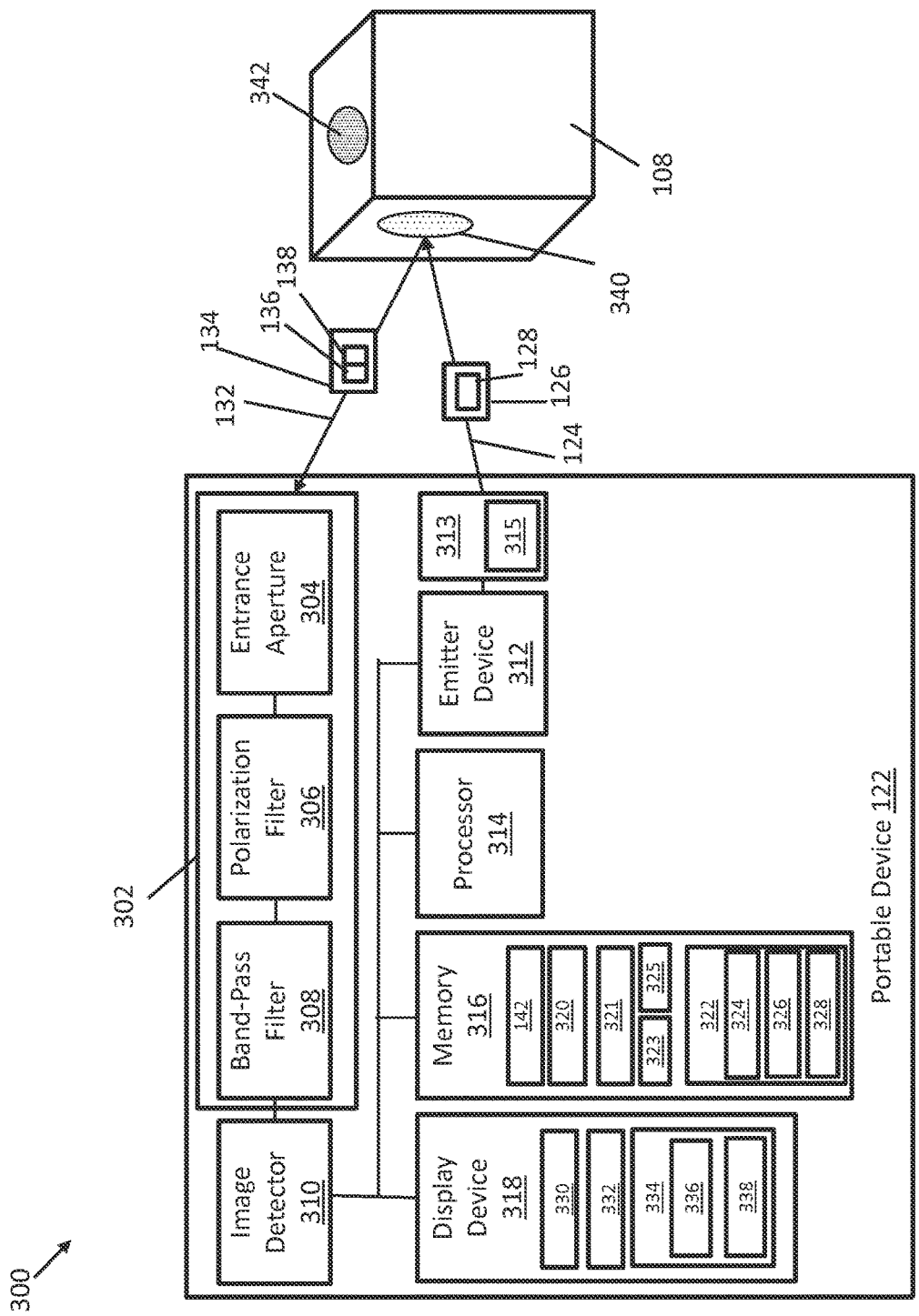
FIG. 3 is a diagram of a portable device used in the environment of FIG. 1 and a cell of the battery of FIG. 1.

FIG. 3 is a diagram 300 of portable device 122 and first cell 108. An emitter device 312 included in portable device 122 emits an activation signal 124 (e.g., electromagnetic radiation 126 at a predefined frequency or frequency range). A directing component 313, which in some implementations, includes at least one optical lens 315, directs activation signal 124 to a first portion 340 of first cell 108. As described above, first cell 108 is coated with first thermochromatic coating 114. In response to being exposed to activation signal 124, the first probes 206 reach a temperature greater than first threshold temperature 214 within first time period 216 and fluoresce with a first color 210 and first intensity 212. More specifically, first portion 340 emits response signal 132 that includes thermochromatic response 134, in which colors 136 include first color 210 and intensities 138 include first intensity 212. In operation, the second portion 342 of first cell 108 experiences a temperature that exceeds second threshold temperature 222 within second time period 224. When exposed to activation signal 124, second portion 342 fluoresces with second color 218 and second intensity 220.

Response signal 132, which in at least some implementations, is reflected light, enters a conditioning component 302 of portable device 122 through an entrance aperture 304 of portable device 122. Conditioning component 302 includes entrance aperture 304, a polarization filter 306, and a band-pass filter 308. Entrance aperture 304 is an opening configured to receive electromagnetic radiation, including response signal 132. Polarization filter 306 receives the electromagnetic radiation (e.g., light) and reduces or removes glare from external sources, such as solar radiation or other reflected light. Band-pass filter 308 filters out any additional noise (e.g., electromagnetic radiation outside of a predefined frequency range), thereby enabling portable device 122 to accurately and precisely detect colors 136 and intensities 138 in thermochromatic response 134 in environments that have ambient light 135 and/or other sources of electromagnetic radiation. For example, portable device 122 is able to accurately and precisely detect colors 136 and intensities 138 in thermochromatic response 134 while first cell 108 is located in vehicle 102, rather than requiring first cell 108 to be moved to a dark room for analysis by portable device 122.

Image detector 310, which in some implementations is a linear array detector, receives response signal 132 after response signal 132 has passed through conditioning component 302. Processor 314 receives electrical signals from image detector 310 and performs analysis thereon. More specifically, processor 314 converts the electrical signals into images 142 and stores images 142 in memory 316. In some implementations, processor 314 stores images 142 in a thermal history map 320. Thermal history map 320 includes, for example, thermochromatic responses 134, and more specifically colors 136 and intensities 138 of a particular object or portions of objects (e.g., first portion 340 of first cell 108) over time. In some implementations, memory 316 includes previous temperatures 323 detected by portable device 122. In some implementations, portable device 122 stores previous temperatures 323 in thermal history map 320 in association with images 142. In some implementations, portable device 122 stores thresholds 321 representing one or more previous temperatures (e.g., previous temperatures 323 and/or predefined threshold temperatures such as first threshold temperature 214 and/or second threshold temperature 222) and determines, based on a response signal 132, that one or more thresholds 321 have been exceeded. In some implementations, processor 314 detects predefined temperature variances 325 and trends in thermal history map 320 and outputs a recommendation, for example on display device 318. The recommendation, is for example, a recommendation to replace first cell 108 because first cell 108 is associated with a trend of increasing temperatures over time. Processor 314 additionally, compares colors 136 and intensities 138 to reference colors 324 and reference intensities 326 associated with respective temperatures 328 in memory 316. By performing such comparisons, processor 314 determines if a particular portion (e.g., first portion 340) of an object (e.g., first cell 108) has exceeded either the first threshold temperature 214 or the second temperature threshold 222.

In some implementations, processor 314 causes display device 318 to display images 142. Further, processor 314 causes display device 318 to display cross hairs 330. Further, processor 314 causes display device 318 to display visual indications 332, for example outlines, around portions of an object (e.g., first portion 340 and/or second portion 342 of first cell 108) that are "hotspots" (e.g., areas above a predefined threshold temperature, such as first threshold temperature 214). Additionally, processor 314 causes display device 318 to display a read-out 334 (e.g., text) of a detected color 336 and a detected intensity 338 located in cross hairs 330.

Figure 4:
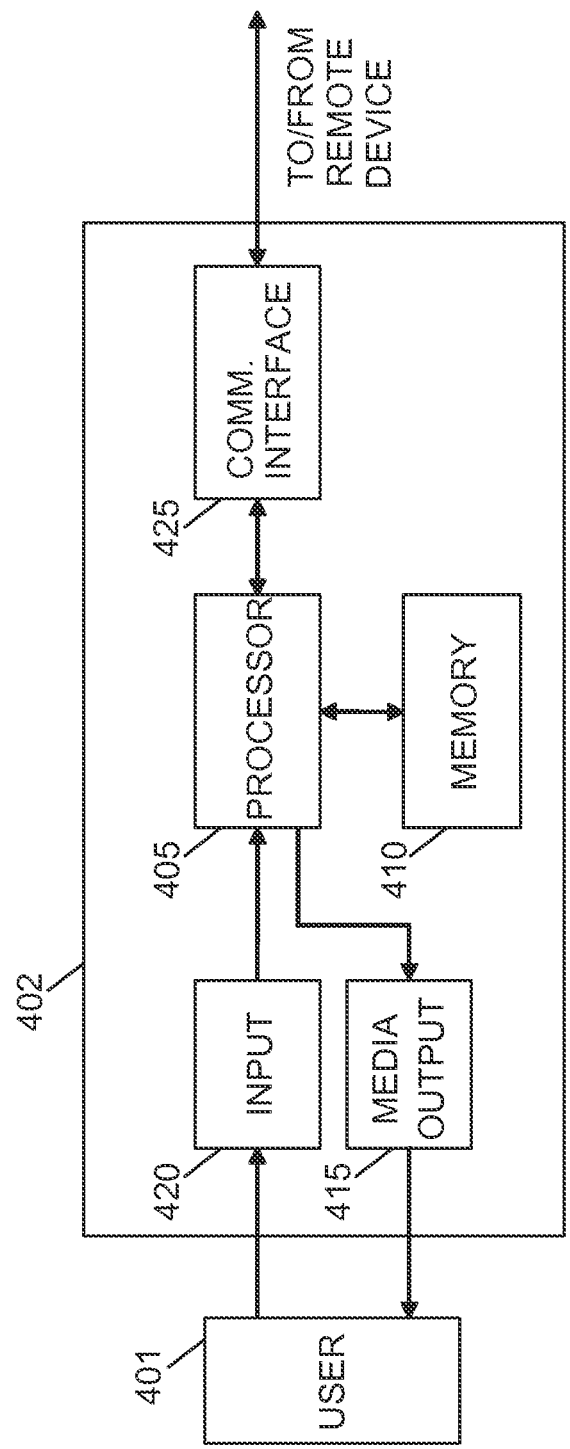
FIG. 4 is a block diagram of an example computing device used in the environment of FIG. 1.

FIG. 4 is a block diagram of an example computing device 402. Computing device 402 is representative of portable device 122 and monitoring computing device 144. More specifically, portable device 122 and monitoring device 144 include one or more components of computing device 402. Computing device 402 includes at least one processor 405 for executing instructions. In some implementations, executable instructions are stored in a memory device 410. Processor 405 may include one or more processing units (e.g., in a multi-core configuration). One or more memory devices 410 are any one or more devices allowing information such as executable instructions and/or other data to be stored and retrieved. One or more memory devices 410 may include one or more computer-readable media.

Computing device 402 also includes at least one media output component 415 for presenting information to a user 401. Media output component 415 is any component capable of conveying information to user 401. In some implementations, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones). In at least some implementations, media output component 415 causes one or more of images 142, cross hairs 330, indications 332, read-out 334, detected colors 336, and detected intensities 338 to be displayed to user 401.

In some implementations, computing device 402 includes an input device 420 for receiving input from user 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Computing device 402 additionally includes a communication interface 425, which is communicatively couplable to a remote device such as another computing device 402. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in one or more memory devices 410 are, for example, computer-readable instructions for providing a user interface to user 401 via media output component 415 and, optionally, receiving and processing input from input device 420. A user interface may include, text, graphics, and/or sound that enable user 401 to interact with computing device 402.

Figure 5:
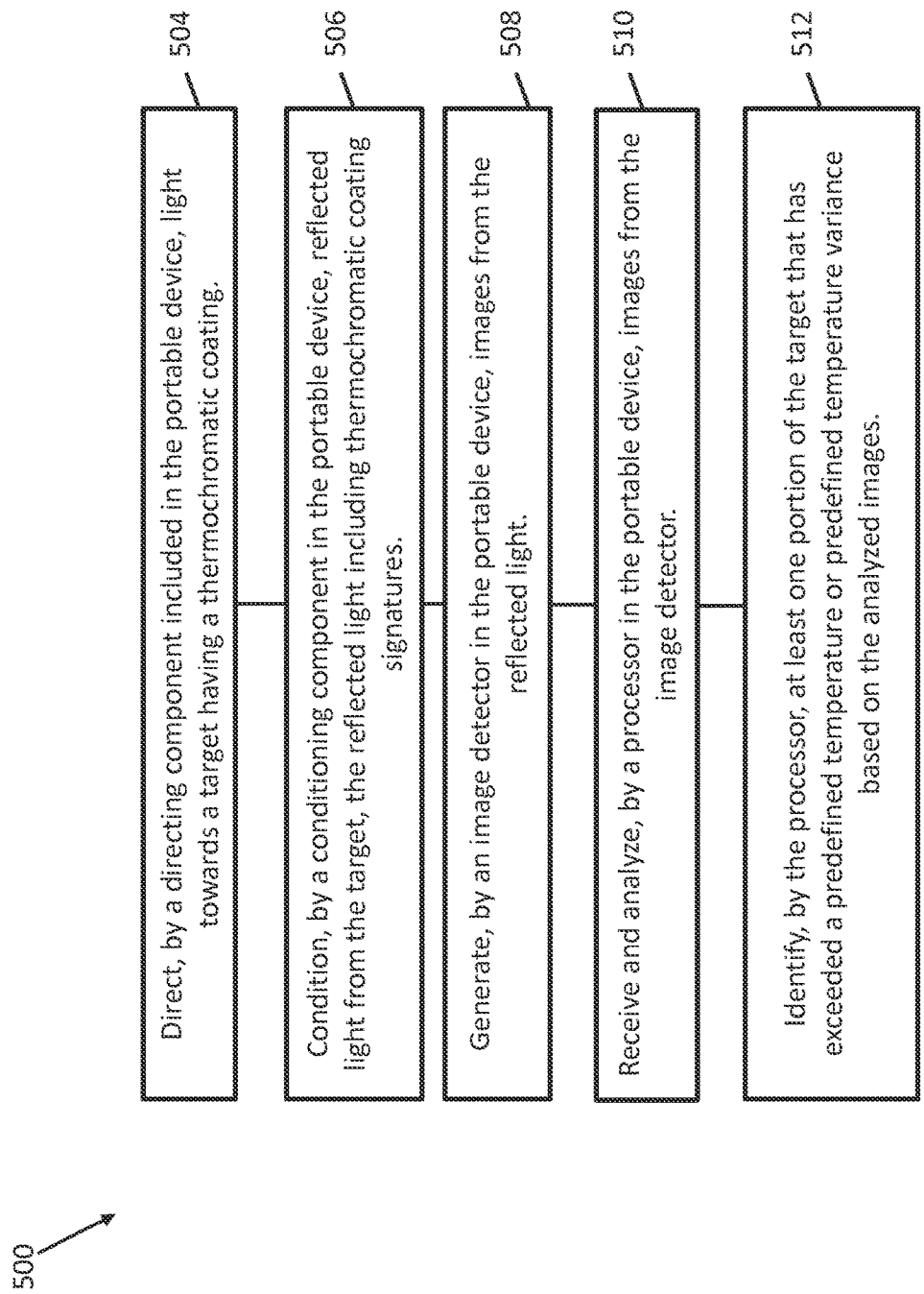
FIG. 5 is a diagram of an example process for using the portable device of FIGS. 1 and 3 to quantify thermochromatic coating signatures.

FIG. 5 is a diagram of a process 500 for use in quantifying thermochromatic coating signatures (e.g., colors 136 and intensities 138 in thermochromatic responses 134). Process 500 includes directing 504, by a directing component (e.g., directing component 313) in the portable device (e.g., portable device 122), light (e.g., activation signal 124) towards a target (e.g., first cell 108) having a thermochromatic coating (e.g., first thermochromatic coating 114). Additionally, process 500 includes conditioning 506, by a conditioning component (e.g., conditioning component 302) in the portable device (e.g., portable device 122), reflected light (e.g., response signal 132) from the target (e.g., first cell 108). The reflected light (e.g., response signal 132) includes thermochromatic coating signatures (e.g., one or more colors 136 and intensities 138 in thermochromatic response 134). Additionally, process 500 includes generating 508, by an image detector (e.g., image detector 310) in the portable device (e.g., portable device 122), images (e.g., images 142) from the reflected light (e.g., response signal 132). Additionally, process 500 includes receiving and analyzing 510, by a processor (e.g., processor 314) in the portable device (e.g., portable device 122) images (e.g., images 142) from the image detector (e.g., image detector 310). Additionally, process 500 includes identifying 512, by the processor (e.g., processor 314), at least one portion of the target (e.g., first portion 340 of first cell 108) that has exceeded a predefined temperature (e.g., one of thresholds 321), or predefined temperature variance (e.g., variance 325) based on the analyzed images (e.g., images 142).

In some implementations, process 500 additionally includes displaying, by a display device (e.g., display device 318) included in the portable device (e.g., portable device 122), a visual indication (e.g., visual indication 332) that the at least one portion (e.g., first portion 340) has exceeded the predefined threshold (e.g., one of thresholds 321). In some implementations, process 500 additionally includes displaying cross hairs (e.g., cross hairs 330) using the display device (e.g., display device 318) included in the portable device (e.g., portable device 122) and displaying, by the display device (e.g., display device 318), a read-out (e.g., read-out 334) of a color (e.g., detected color 336) and an intensity (e.g., detected intensity 338) of the target (e.g., first portion 340 of first cell 108) in the cross hairs (e.g., cross hairs 330). In some implementations, process 500 additionally includes storing the images (e.g., images 142) as a thermal history map (e.g., thermal history map 320) in a memory (e.g., memory 316) of the portable device (e.g., portable device 122). In some implementations, process 500 includes storing, in a memory (e.g., memory 316) of the portable device (e.g., portable device 122), a lookup table (e.g., lookup table 322) of reference temperatures (e.g., reference temperatures 328) associated with reference colors (e.g., reference colors 324) and reference intensities (e.g., reference intensities 326). Further, in some implementations, process 500 includes determining, by the processor (e.g., processor 314), a temperature associated with the at least one portion (e.g., first portion 340) by retrieving, from the lookup table (e.g., lookup table 322), a reference temperature (e.g., reference temperature 328) associated with a color (e.g., detected color 336) and an intensity (e.g., detected intensity 338) detected by the image detector (e.g., image detector 310).

In some implementations, process 500 additionally includes filtering the reflected light (e.g., response signal 132) using a band-pass filter (e.g., band-pass filter 308) included in the conditioning component (e.g., conditioning component 302). In some implementations, process 500 additionally includes filtering the reflected light (e.g., response signal 132) using a polarization filter (e.g., polarization filter 306) included in the conditioning component (e.g., conditioning component 302).

In some implementations, process 500 additionally includes transmitting the images (e.g., images 142) from the portable device (e.g., portable device 122) to a computing device (e.g., monitoring computing device 144). In some implementations, directing the light (e.g., activation signal 124) includes directing the light (e.g., activation signal 124) at one or more of a battery (e.g., battery 104), a battery cell (first battery cell 108 and/or second battery cell 110), and a battery container (e.g., container 112).

A technical effect of systems and methods described herein includes at least one of: (a) directing, by a directing component included in a portable device, light towards a target having a thermochromatic coating; (b) conditioning, by a conditioning component in the portable device, reflected light from the target, the reflected light including thermochromatic coating signatures; (c) generating, by an image detector in the portable device, images from the reflected light; (d) receiving and analyzing, by a processor in the portable device, images from the image detector; and (e) identifying, by the processor, at least one portion of the target that has exceeded a predefined temperature or predefined temperature variance based on the analyzed images.

As compared to known methods and systems for detecting temperatures of objects using thermochromatic responses, the methods and systems described herein enable the use of a portable device that provides more precise and accurate quantification of thermochromatic responses (i.e., thermochromatic coating signatures), even in environments that include ambient light and/or other sources of electromagnetic noise.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A portable device for quantification of thermochromatic coating signatures, said portable device comprising:
    a directing component configured to direct light to a target having a thermochromatic coating;
    a conditioning component configured to condition reflected light from the target, the reflected light including thermochromatic coating signatures;
    an image detector configured to generate images from the conditioned reflected light; and
    a processor configured to:
        receive and analyze images from the image detector;
        compare, from the images, at least one of a color or an intensity of the thermochromatic coating signatures on at least one portion of the target to a reference color or a reference intensity; and
        identify the at least one portion of the target that has exceeded a predefined temperature or predefined temperature variance based on the comparison.

2. The portable device of claim 1, wherein said emitter device is configured to emit ultraviolet light.

3. The portable device of claim 1, wherein said conditioning component includes a band-pass filter.

4. The portable device of claim 1, wherein said conditioning component includes a polarization filter.

5. The portable device of claim 1, wherein said conditioning component includes an entrance aperture.

6. The portable device of claim 1, wherein the image detector includes a linear array detector.

7. The portable device of claim 1, further comprising a display device, wherein said processor is further configured to visually indicate that the at least one portion has exceeded the predefined temperature.

8. The portable device of claim 1, further comprising a display device, wherein said processor is further configured to:
    visually indicate cross hairs; and
    display a read-out of a color and an intensity of the target in the cross hairs.

9. The portable device of claim 1, further configured to transmit the images to a computing device wirelessly.

10. The portable device of claim 1, further comprising a memory storing a lookup table of reference temperatures associated with reference colors and reference intensities, wherein said processor is further configured to determine a temperature associated with the at least one portion by retrieving a reference temperature associated with the color and the intensity detected by the image detector.

11. A method for use in quantifying thermochromatic coating signatures, said method comprising:
    directing, by a directing component included in the portable device, light towards a target having a thermochromatic coating;
    conditioning, by a conditioning component in the portable device, reflected light from the target, the reflected light including thermochromatic coating signatures;
    generating, by an image detector in the portable device, images from the reflected light;
    receiving and analyzing, by a processor in the portable device, images from the image detector;
    comparing, from the images, at least one of a color or an intensity of the thermochromatic coating signatures on at least one portion of the target to a reference color or a reference intensity; and
    identifying, by the processor, the at least one portion of the target that has exceeded a predefined temperature or predefined temperature variance based on the comparison.

12. The method of claim 11, further comprising displaying, by a display device included in the portable device, a visual indication that the at least one portion has exceeded the predefined temperature.

13. The method of claim 11, further comprising:
    displaying, by a display device included in the portable device, cross hairs; and
    displaying, by the display device, a read-out of a color and an intensity of the target in the cross hairs.

14. The method of claim 11, further comprising:
    storing, in a memory of the portable device, a lookup table of reference temperatures associated with reference colors and reference intensities; and
    determining, by the processor, a temperature associated with the at least one portion by retrieving, from the lookup table, a reference temperature associated with the color and the intensity detected by the image detector.

15. The method of claim 11, further comprising filtering the reflected light using a band-pass filter included in the conditioning component.

16. The method of claim 11, further comprising filtering the reflected light using a polarization filter included in the conditioning component.

17. The method of claim 11, further comprising transmitting the images from the portable device to a computing device.

18. The method of claim 17, wherein transmitting the images further comprises transmitting the images wirelessly.

19. The method of claim 11, wherein directing the light further comprises directing the light at one or more of a battery, a battery cell, and a battery container.

20. The method of claim 11, further comprising filtering out ambient light by the conditioning component.

* * * * *